(12) United States Patent
Shinohara et al.

(10) Patent No.: US 6,718,217 B1
(45) Date of Patent: Apr. 6, 2004

(54) DIGITAL AUDIO TONE EVALUATING SYSTEM

(75) Inventors: Hironobu Shinohara, Machida (JP);
Kiyohiro Horie, Yokohama (JP);
Naraji Sakamoto, Kawanishi (JP);
Tetsuo Fujihara, Sanda (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/200,747

(22) Filed: Nov. 30, 1998

(30) Foreign Application Priority Data

Dec. 2, 1997 (JP) ............................... 9-331879

(51) Int. Cl.7 .......................... G06F 17/00; H03G 3/00; G10H 1/06; G10L 19/00
(52) U.S. Cl. ............................. 700/94; 381/61; 84/622; 704/500
(58) Field of Search ............................. 700/94; 381/61, 381/63, 101, 58; 704/500–504; 84/622, 659

(56) References Cited

U.S. PATENT DOCUMENTS

| | | | |
|---|---|---|---|
| 4,791,671 A | | 12/1988 | Willems |
| 5,450,312 A | * | 9/1995 | Lee et al. ....................... 700/1 |
| 5,784,476 A | * | 7/1998 | Bird ............................. 381/107 |
| 5,876,213 A | * | 3/1999 | Matsumoto ............. 434/307 A |
| 5,886,276 A | * | 3/1999 | Levine et al. ................. 84/603 |
| 5,915,237 A | * | 6/1999 | Boss et al. ................ 704/270.1 |

OTHER PUBLICATIONS

Patent Abstracts of Japan, vol. 012, No. 189 (E–616), Jun. 2, 1988, JP 62 292009, Dec. 18, 1987.
Patent Abstracts of Japan, vol. 1998, No. 11, Sep. 30, 1998, JP 10 163778, Jun. 19, 1998.
Patent Abstracts of Japan, vol. 1996, No. 06, Jun. 28, 1996, JP 08 030296, Feb. 2, 1996.
Patent Abstracts of Japan, 05–316588, Nov. 26, 1993.

\* cited by examiner

*Primary Examiner*—Minsun Oh Harvey
*Assistant Examiner*—Laura A. Grier
(74) *Attorney, Agent, or Firm*—Oblon, Spivak, McClelland, Maier & Neustadt, P.C.

(57) ABSTRACT

Disclosed herein is a digital audio tone evaluating system comprising an analyzer for subjecting a digital signal related to voice and/or music to signal processing, thereby operating a factor which expresses the auditory tone quality of the voice and/or the music by the digital signal in a digitized form. The system can objectively evaluate auditory tone quality by digital audio.

13 Claims, 13 Drawing Sheets

F I G. 14
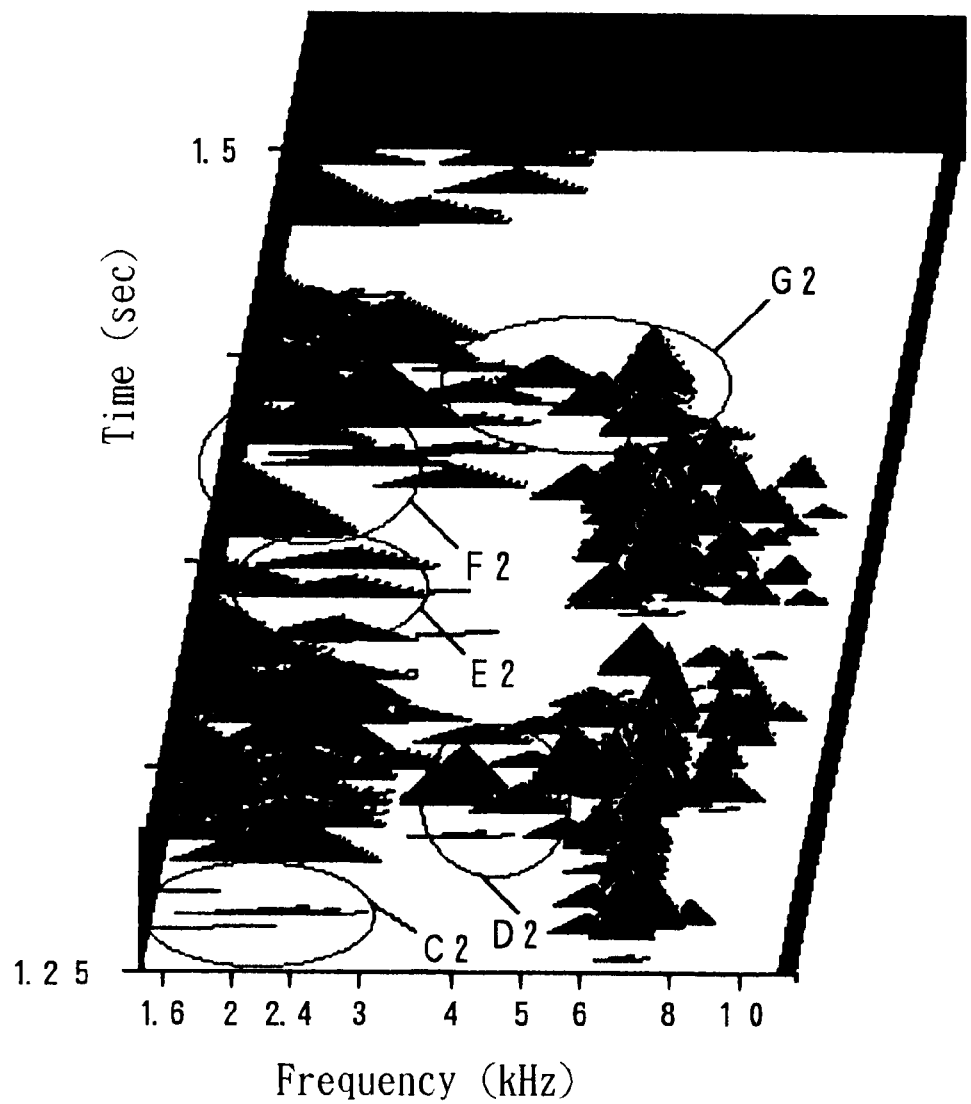

DIGITAL AUDIO TONE EVALUATING SYSTEM

BACKGROUND OF THE INVENTION

1. Field of the Invention

The present invention relates to a digital audio tone evaluating system, and particularly to a digital audio tone evaluating system which can objectively evaluate auditory tone quality.

2. Description of the Background Art

Tone evaluation as to digital audio system has heretofore been conducted on a medium in which a digital signal related to voice and/or music has been recorded, as well as a reproducing device for reproducing a digital signal recorded in a medium.

With respect to the medium, a digital signal recorded in a medium to be evaluated is reproduced by a standard reproducing device having a required performance, and the reproduced digital signal is analyzed, thereby conducting the evaluation of the medium. On the other hand, concerning the reproducing device, a prescribed digital signal recorded in a standard medium is reproduced by a reproducing device to be evaluated, and the reproduced digital signal is analyzed, thereby conducting the evaluation of the reproducing device. In the analysis of each digital signal, the reproduced digital signal related to voice and/or music is generally subjected to signal processing by fast Fourier transformation (FFT), thereby obtaining data related to frequency characteristics. This data is compared with the reference data from, for example, a master tape.

The fast Fourier transformation is a method for operating representation (Fourier transformation) in a frequency domain to a waveform (period function) in a time domain at a high speed, and is representative of frequency spectrum analysis.

Various waveforms forming voice and music generally contain a great number of frequency components. When a continuous-time signal f(t) by these waveforms has a constant period T, namely, f(t)=f(t−T), the continuous-time signal f(t) is expressed by the following equation (1):

$$f(t) = \sum_{n=-\infty}^{\infty} C_n e^{jn\omega t}$$

wherein ω is an angular frequency (2π/T), and Cn is a higher harmonic amplitude represented by the following equation:

$$C_n = \frac{1}{T} \int_0^T f(t) \varepsilon^{-jn\omega t} dt$$

Such a continuous-time signal is sampled at fixed time intervals, and the discrete Fourier transformation (DFT) of the sampled signals is operated at a high speed, thereby obtaining the fast Fourier transformation. Accordingly, the resolution of frequency by the fast Fourier transformation comes to the division of the specified frequency band by a constant frequency width, and the time resolution also becomes constant.

However, the analysis of a digital signal by the fast Fourier transformation is used with the principal object of observing frequency characteristics and does not represent human auditory characteristics themselves having peculiar time constitution and frequency resolving power.

There are also means for evaluating frequency characteristics through an equalizer having auditory correction characteristics that change a level according to frequency in imitation of the sense of hearing. However, such characteristics are different from actual auditory characteristics and correspond thereto only when a reproduced sound is lower than a certain level, and so they are strictly only data not much exceeding reference. Therefore, such means are not practical.

In recent years, it has been pointed out that when sounds reproduced by digital audio are auditioned, their tone qualities delicately vary according to the materials of media or reproducing devices though no difference is observed in analyses by the fast Fourier transformation. However, such tone evaluation is subjective evaluation by listeners, and there has not been yet conducted under the circumstances any objective tone evaluation according to the human sense of hearing.

SUMMARY OF THE INVENTION

The present invention has been made on the basis of the foregoing circumstances and has as its object the provision of a digital audio tone evaluating system which can objectively evaluate auditory tone quality by digital audio.

The above object can be achieved by the present invention described below.

According to the present invention, there is thus provided a digital audio tone evaluating system comprising an analyzer for subjecting a digital signal related to voice and/or music to signal processing, thereby operating a factor which expresses the auditory tone quality of the voice and/or the music by the digital signal in a digitized form.

According to the present invention, there is also provided a digital audio tone evaluating system comprising:

a reproducing device for reproducing a digital signal according to a specified digital audio format, related to voice and/or music recorded in a medium to be evaluated; and an analyzer for subjecting the digital signal from the reproducing device to signal processing, thereby operating a factor which expresses the auditory tone quality of the voice and/or the music by the digital signal in a digitized form.

According to the present invention, there is provided a digital audio tone evaluating system comprising:

an analyzer for subjecting a digital signal, which is inputted from a reproducing device to be evaluated for producing a digital signal according to a specified digital audio format, related to voice and/or music recorded in a standard medium, to signal processing, thereby operating a factor which expresses the auditory tone quality of the voice and/or the music by the digital signal in a digitized form.

According to the present invention, there is further provided a digital audio tone evaluating system comprising:

a reproducing device for reproducing a digital signal related to voice and/or music recorded in a medium to be evaluated;

a digital-analog converter for converting the digital signal from the reproducing device into an analog signal;

an analog-digital converter for converting the analog signal from the digital-analog converter into a digital signal according to a specified digital audio format; and an analyzer for subjecting the digital signal from the analog-digital converter to signal processing, thereby operating a factor which expresses the auditory tone quality of the voice and/or the music by the digital signal in a digitized form.

According to the present invention, there is still further provided a digital audio tone evaluating system comprising:

a digital-analog converter for converting a digital signal, which has been outputted from a reproducing device to be evaluated by which a digital signal related to voice and/or music recorded in a standard medium is reproduced, into an analog signal;

an analog-digital converter for converting the analog signal from the digital-analog converter into a digital signal according to a specified digital audio format; and an analyzer for subjecting the digital signal from the analog-digital converter to signal processing, thereby operating a factor which expresses the auditory tone quality of the voice and/or the music by the digital signal in a digitized form.

According to the present invention, there is yet still further provided a digital audio tone evaluating system for evaluating a digital-analog converter built-in reproducing device, comprising:

an analog-digital converter for converting an analog signal, which has been outputted from a reproducing device to be evaluated by which a digital signal related to voice and/or music recorded in a standard medium is reproduced and converted into the analog signal, into a digital signal according to a specified digital audio format; and an analyzer for subjecting the digital signal from the analog-digital converter to signal processing, thereby operating a factor which expresses the auditory tone quality of the voice and/or the music by the digital signal in a digitized form.

According to the digital audio tone evaluating systems of the present invention, a digital signal related to voice and/or music is subjected to signal processing in the analyzer, thereby operating a factor which expresses the auditory tone quality of the voice and/or the music by the digital signal in a digitized form. Therefore, the auditory tone quality can be objectively evaluated without actually auditioning the voice and/or the music.

In addition, a digital signal from a reproducing device is converted by the digital-analog converter into an analog signal, and the analog signal from the digital-analog converter is converted by the analog-digital converter into a digital signal according to a specified digital audio format which can be processed by the analyzer, and so tone evaluation can be conducted as to media in which digital signals according to various digital audio formats have been separately recorded, and reproducing devices for reproducing the digital signals in these media, by use of the analyzer commonly.

BRIEF DESCRIPTION OF THE DRAWINGS

The above and other objects, features and advantages of the present invention will become apparent from the following description and the appended claims, taken in conjunction with the accompanying drawings, in which:

FIG. 14 illustrates the operation result of high-resolution spectral analysis in the digital music signal recorded in the digital audio tape in Example 2.

DETAILED DESCRIPTION OF THE PREFERRED EMBODIMENTS

The digital audio tone evaluating systems according to the present invention will hereinafter be described in detail.

Figure 1:
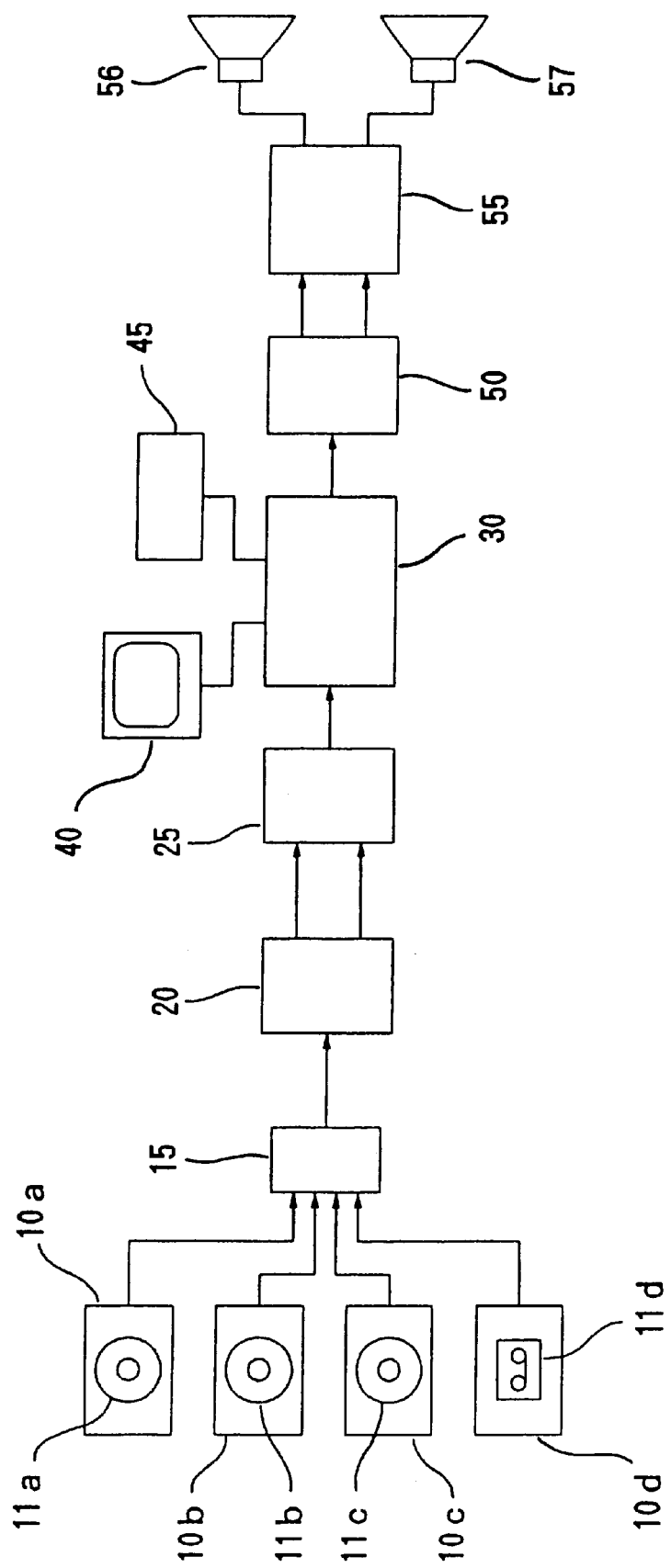
FIG. 1 schematically illustrates the construction of a digital audio tone evaluating system according to an embodiment of the present invention.

FIG. 1 schematically illustrates the construction of a digital audio tone evaluating system according to an embodiment of the present invention. In FIG. 1, reference characters 10a, 10b, 10c and 10d indicate reproducing devices for reproducing digital signals related to voice and/or music recorded in media 11a, 11b, 11c and 11d, respectively, and reference numeral 15 designates a signal change-over switch for selecting and outputting one of the digital signals from the reproducing devices 11a to 11d.

Reference numeral 20 indicates a digital-analog converter for converting the digital signal from the signal change-over switch 15 into an analog signal, which the converter is capable of setting digital audio formats, such as sampling frequency, according to a digital signal to be processed. Reference numeral 25 indicates an analog-digital converter for converting the analog signal from the digital-analog converter 20 into a digital signal according to a specified digital audio format.

Reference numeral 30 designates an analyzer for subjecting the digital signal from the analog-digital converter 25 to signal processing, thereby operating a factor which expresses the auditory tone quality of the voice and/or the music by the digital signal in a digitized form. A display 40 for displaying the analyzed result and a printer 45 for outputting the analyzed result are connected to the analyzer 30.

Reference numeral 50 indicates a digital-analog converter for converting the digital signal outputted from the analyzer 30 into an analog signal, reference numeral 55 designates an amplifier for amplifying energy of the analog signal from the digital-analog converter 50, and reference numerals 56 and 57 indicate speakers.

In the embodiment illustrated, the four reproducing devices 10a to 10d respectively output digital signals according to different digital audio formats. Specifically, the reproducing device 10a is composed of a compact disk player which reproduces a digital signal recorded in the medium 11a composed of a compact disk (CD), the reproducing device 10b is composed of a digital video disk player which reproduces a digital signal recorded in the medium 11b composed of a digital video disk (DVD), the reproducing device 10c is composed of a minidisk player which reproduces a digital signal recorded in the medium 11c composed of a minidisk (MD), and the reproducing device 10d is composed of a digital audio tape player which reproduces a digital signal recorded in the medium 11d composed of a digital audio tape (DAT).

Figure 2:
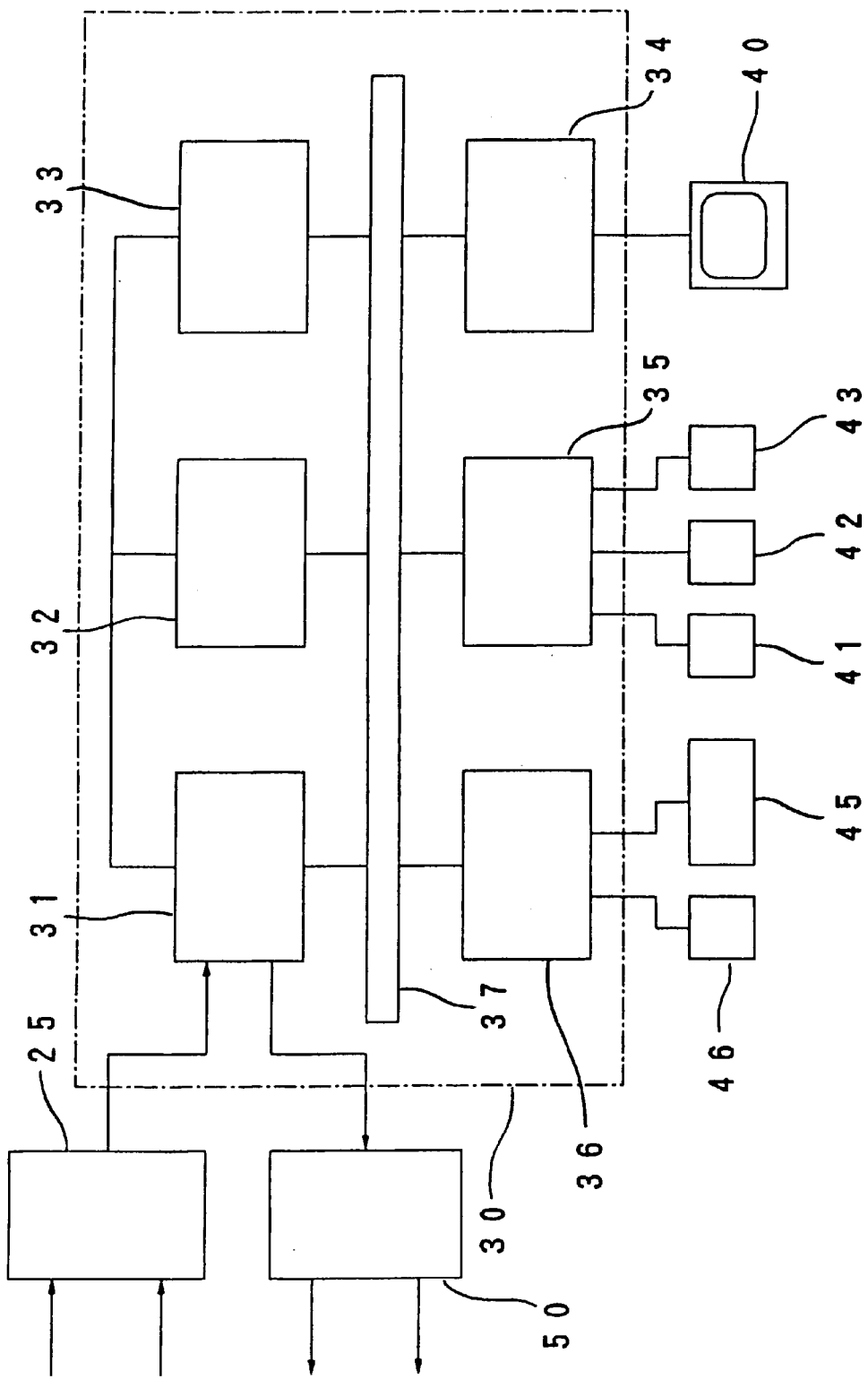
FIG. 2 schematically illustrates the construction of an exemplary analyzer.

FIG. 2 schematically illustrates the construction of an example of the analyzer 30. In FIG. 2, reference numeral 31 indicates an interface for converting the digital signal from a digital audio format to an operating format and besides from the operating format to the digital audio format, and reference numerals 32 and 33 designate digital signal processors for operating a factor, which expresses the tone quality of the voice and/or the music by the digital signal, on the basis of the digital signal inputted. Reference numeral 34 indicates a graphic controller for displaying, for example, an analytic process and analyzed results by the digital signal processors 32, 33. Reference numeral 35 designates a controller for storing the inputted digital signal and the analyzed results by the digital signal processors 32, 33 in a hard disk 41, a solid-state memory 42 or a floppy disk 43. Reference numeral 36 indicates serial/parallel control circuit for controlling the digital signal processors 32, 33, the graphic controller 34 and the controller 35. An operating device 46 such as a mouse and/or a keyboard, and a printer 45 are connected to the serial/parallel control circuit 36. Reference numeral 37 indicates a bus.

In the above-described digital audio tone evaluating system, the media 11a to 11d to be evaluated are set in the respective reproducing devices 10a to 10d, and digital signals related to voice and/or music recorded in the media 11a to 11d are reproduced by the respective reproducing devices 10a to 10d. One of the reproduced digital signals is inputted into the digital-analog converter 20 through the signal change-over switch 15 and converted into an analog signal by the digital-analog converter 20, whereby an original waveform of the voice and/or the music for tone evaluation is formed. This analog signal is converted into a digital signal according to a specified digital audio format by the analog-digital converter 25. This digital signal is inputted into the analyzer 30.

In the analyzer 30, the serial/parallel control circuit 36 is operated by the operating device 46, thereby conducting signal processing of the digital signal in the following manner.

The digital signal inputted into the analyzer 30 is sampled for a suitable time length. The sampled digital signal is converted from a digital audio format to an operating format by the interface 31 and then stored in the hard disk 41, the solid-state memory 42 or the floppy disk 43 by the controller 35 and at the same time inputted into the digital signal processors 32, 33. In the digital signal processors 32, 33, a factor, which expresses the tone quality of the voice and/or the music by the digital signal, is operated on the basis of the digital signal inputted.

As factors expressing the tone quality, are used loudness advocated by Eberhard Zwicker and standardized in ISO 532, and other acoustic psychological parameters such as sharpness, roughness, a feeling of variation, tonality, hearing model and high-resolution spectral analysis (hereinafter referred to as "HAS"). Of these, the loudness, roughness and HAS are extremely important factors.

The term "loudness" expresses the loudness of sound equivalent to the sense of hearing (unit: sone), the term "sharpness" expresses such a high-compass component as feels high-pitched (unit: acum), the term "roughness" expresses the degree of delicate variation of sound (modulation), or the roughness of sound (unit: asper), the term "feeling of variation" expresses a feeling of sound wave (unit: vacil), the term "tonality" expresses the degree of timbre and noise (unit: tu), the term "hearing model" expresses a level in terms of time and frequency comparable to the sense of hearing (unit: dB), and the term "HAS" expresses a timbre component, which cannot be expressed by fast Fourier transformation, in terms of high resolution (unit: dB).

These acoustic psychological parameters are based on a processing corresponding to otic characteristics having frequency characteristics of non-linear resolving power and are characterized in that a waveform is not resolved by the same frequency width as like in fast Fourier transformation.

In the above, the loudness is operated in the following manner.

Figure 3:
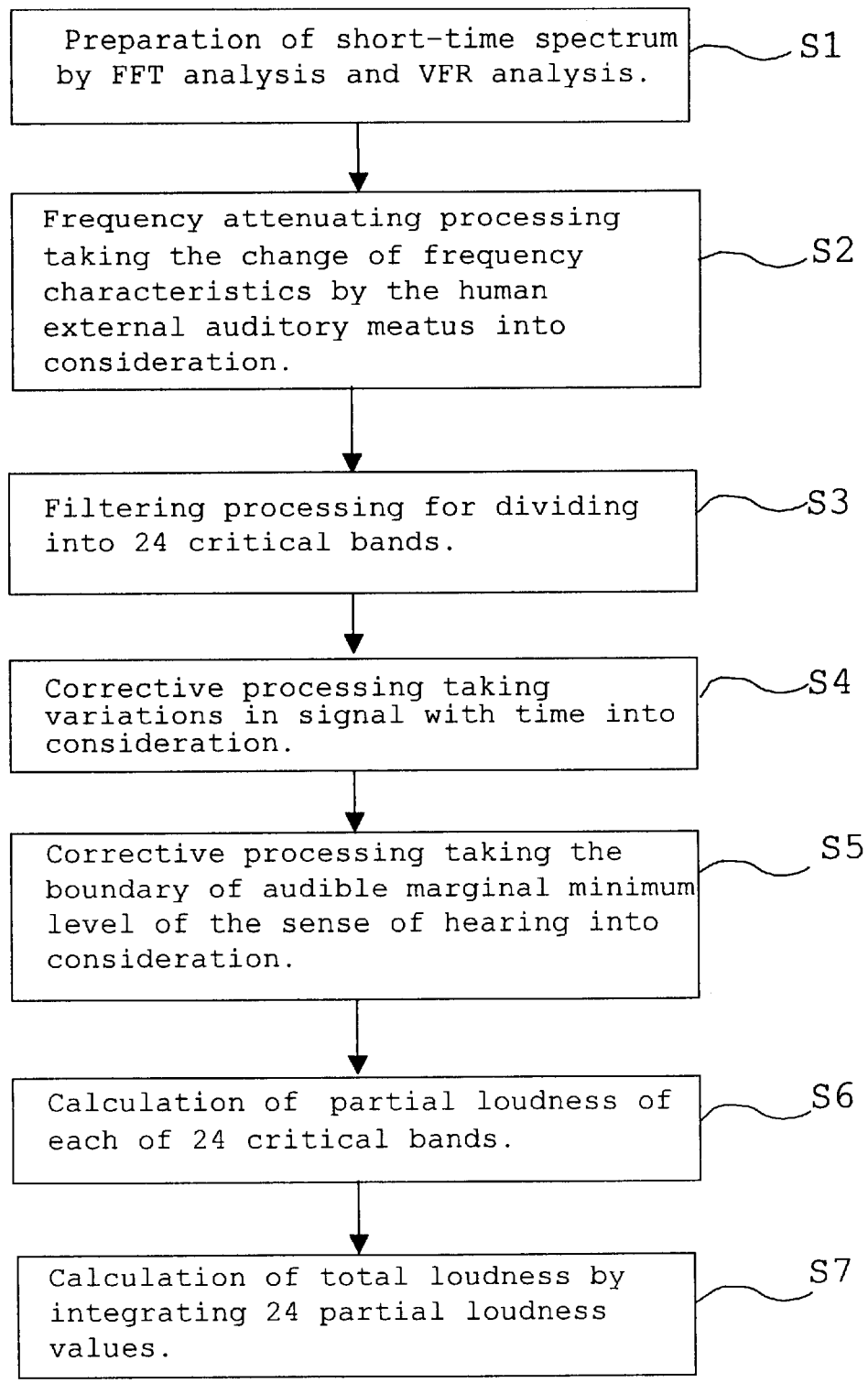
FIG. 3 is a block diagram illustrating a process until loudness is operated.

FIG. 3 is a block diagram illustrating a process until loudness is operated. More specifically, a digital signal related to voice and/or music, which has been converted to an operating format, is analyzed as to fast Fourier transformation (FFT) and variable frequency resolution (VFR) in a first step S1, thereby obtaining a short-time spectrum. In a second step S2, a frequency attenuating processing is conducted as to the short-time spectrum taking the change of frequency characteristics by the human external auditory meatus into consideration. In a third step S3, the short-time spectrum is divided into 24 critical bands by band-pass filters. A central excitatory part created from the sense of hearing is found by adding up all excitatory levels of the critical bands. In a forth step S4, a corrective processing taking variations in signal with time into consideration is conducted. In a fifth step S5, a corrective processing taking the boundary of audible marginal minimum level of the sense of hearing into consideration is conducted. In a sixth step S6, a partial loudness value is calculated out every critical band. In a seventh step S7, respective partial loudness values of the 24 critical bands are integrated, thereby calculating out a total loudness value.

In the above, the partial loudness value every critical band is represented by the following equation (2), and the total loudness value, N is represented by the following equation (3):

Equation (2)

$$N'(Z) = N'_0 \cdot \left(\frac{1}{S} \cdot \frac{E_{HS}(z)}{E_0}\right)^k \cdot \left[\left(1 - s + s\frac{E(z)}{E_{HS}(z)}\right)^k - 1\right] \quad (\text{sone/Bark})$$

wherein N'(z) represents a partial loudness value every critical band, $E_0$ represents a reference value of sound intensity, E(z) represents an excitatory factor as to z, $E_{HS}(z)$ represents an excitatory factor of noise that the human sense of hearing has, $N'_0$ represents a reference loudness value, s represents a boundary factor, and k represents 0.23. "Bark" represents unit of a divided critical band and z denotes its number.

Equation (3)

$$N = \int_{z=0}^{24\,Bark} N'(z)\,dz \quad \text{(sone)}$$

The roughness is expressed by the level of the loudness and modulation frequency. For example, a roughness value of sound obtained by giving amplitude modulation of 70 Hz to a pure tone of 1 kHz the sound pressure level of which is 60 dB is 1 asper.

Specifically, it is found in accordance with the following numerical expressions.

Assuming that a degree of modulation $m_i$ is defined as $$m_i = \sqrt{2\frac{P_{\sim,i}}{P_{-,i}}}$$

wherein $P_{-,i}$ represents a d.c. current of a sub-band signal before resolved into 24 bands through a linear phase filter, and $P_{\sim,i}$ represents a d.c. current of a sub-band signal after resolved into 24 bands through the linear phase filter, the roughness, $r_i$ is:

$r_i = K(m_i k_i)^{1.5}$ (in the case of $m_i < 1$) or $r_i = K m_i k_i$ (in the case of $m_i \geq 1$)

wherein $k_i$ represents a correction function of a model by roughness in the frequency of the sub-band, and K represents a scale factor when the degree of modulation at the time a pure tone of 1 kHz is amplitude-modulated at 60 dB and 70 Hz is regarded as 1.

The sharpness is expressed by loudness of high frequency as against the total loudness, the feeling of variation is expressed by the level of the loudness and modulation frequency, and the tonality is expressed by the loudness of a noise component, and a timbre component. Further, the hearing model is expressed by resolution of time and frequency comparable to the sense of hearing, and the HAS is analyzed in the same manner as a method that the sense of hearing extracts sound as a timbre component composed of sine waves.

After the above manner, the factors which express the tone quality of the voice and/or the music by the digital signal are operated. The data of the operation result is stored in the hard disk 41, the solid-state memory 42 or the floppy disk 43 through the controller 35, and displayed on the display 40 through the graphic controller 34 or recorded on recording paper by the printer 45.

The data of the operation result is compared with a reference data by a master tape (for example, digital audio tape), whereby the tone evaluation as to the media is conducted.

The digital signal stored in the hard disk 41, the solid-state memory 42 or the floppy disk 43 is called as needed, and the voice and/or music by the digital signal is auditioned in the following manner.

The digital signal called out of the hard disk 41, the solid-state memory 42 or the floppy disk 43 is converted from an operating format to a digital audio format by the interface 31 and outputted from the analyzer 30. This digital signal is inputted into the digital-analog converter 50 and converted into an analog signal by the digital-analog converter 50. Energy of this analog signal is amplified by the amplifier 55 and released as a sound wave by the speakers 56, 57.

According to the above-described digital audio tone evaluating system, a digital signal related to voice and/or music is subjected to signal processing in the analyzer 30, thereby operating a factor which expresses the auditory tone quality of the voice and/or the music by the digital signal in a digitized form. Therefore, the auditory tone quality can be objectively evaluated without actually auditioning the voice and/or the music. Besides, the kind of the auditory tone-expressing factor to be digitized can be suitably selected by the operating device 46, thereby grasping differences in auditory tone quality between media, which are caused by differences in conditions such as materials for forming the media, production cycle time of the media, cutting of a master, and recording speed on the master. Therefore, the evaluation system can be effectively utilized for research and development of media.

In addition, a digital signal from one of the reproducing devices 10a to 10d is converted by the digital-analog converter 20 into an analog signal, and the analog signal from the digital-analog converter 20 is converted by the analog-digital converter 25 into a digital signal according to a specified digital audio format which can be processed by the analyzer 30, and so tone evaluation can be conducted as to the media 11a to 11d such as compact disks, digital video disks, minidisks and digital audio tapes in which digital signals according to various digital audio formats have been separately recorded, by use of the analyzer commonly.

Since the speakers 56, 57 are connected to the analyzer 30 through the digital-analog converter 50 and the amplifier 55, the voice and/or the music by the digital signal analyzed can be actually auditioned.

The present invention is not limited to the above-described digital audio tone evaluating system, and various changes and modifications may be made in the invention.

Figure 4:
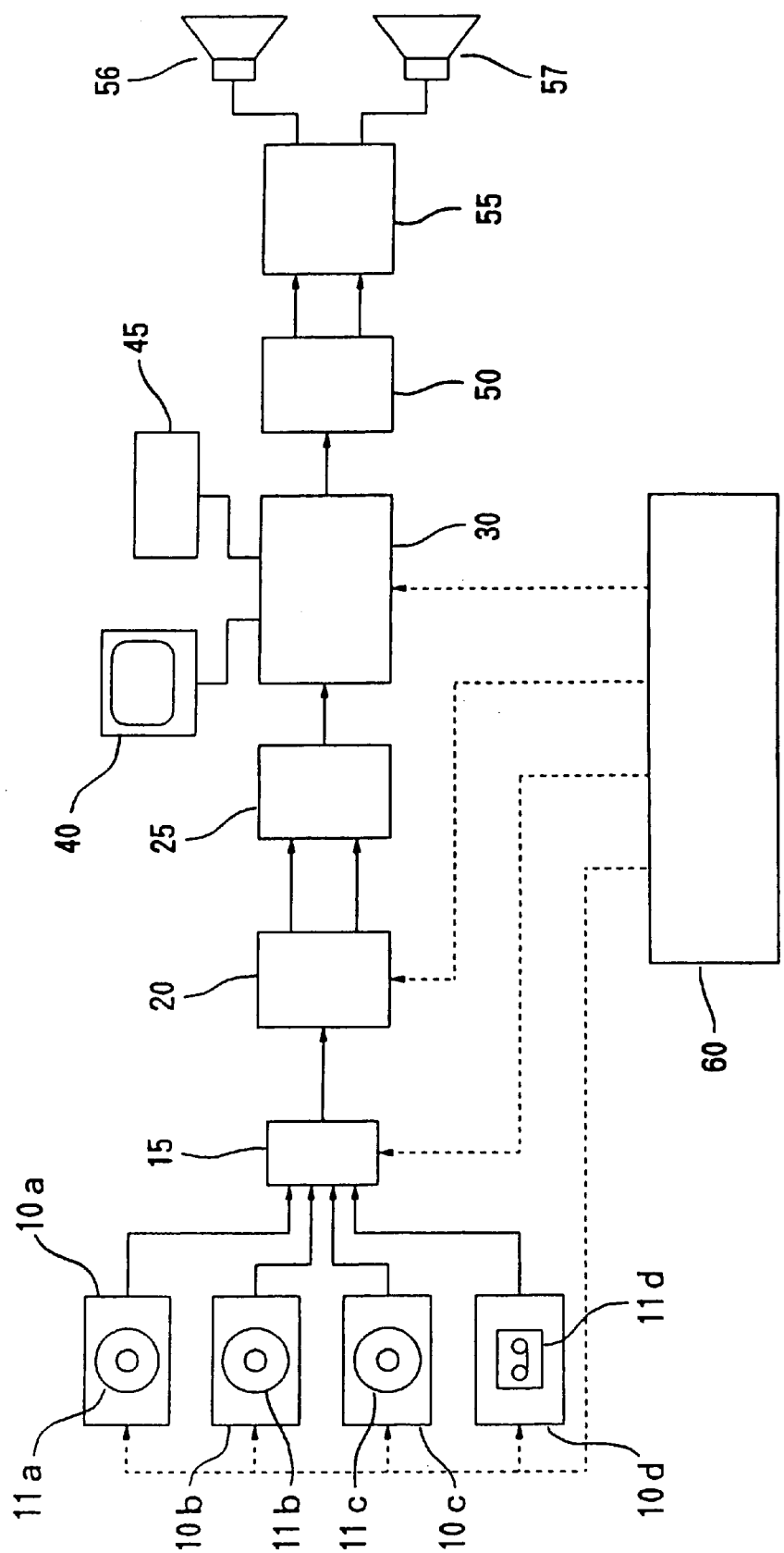
FIG. 4 schematically illustrates the construction of a digital audio tone evaluating system according to another embodiment of the present invention.

For example, as illustrated in FIG. 4, an automatic controller 60 for automatically controlling the reproducing devices 10a to 10d, the signal change-over switch 15, the digital-analog converter 20 and the analyzer 30 may be provided. According to such a digital audio tone evaluating system, the reproduction of digital signals recorded in the media 11a to 11d in the reproducing devices 10a to 10d, selection of a medium to be evaluated from the media 11a to 11d in the change-over switch 15, setting of a digital audio format in the digital-analog converter 20, and signal processing of the digital signal in the analyzer 30 can be automatically conducted, so that tone evaluation as to a great number of media can be conducted with high time efficiency. Accordingly, such a system can be effectively utilized for testing media in which digital signals related to voice and/or music have been recorded.

Figure 5:
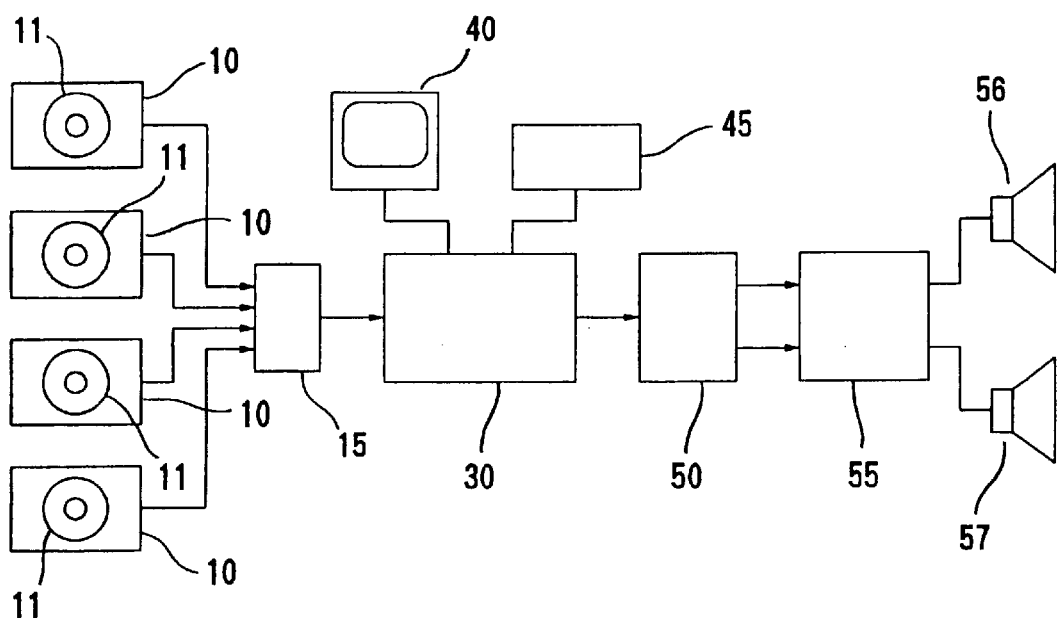
FIG. 5 schematically illustrates the construction of a digital audio tone evaluating system according to a further embodiment of the present invention.

In a case that a digital signal according to a specified digital audio format, which can be processed by the analyzer 30, is recorded in a medium to be evaluated, the system may be constructed that the digital signal reproduced is inputted directly into the analyzer 30. Further, when a plurality of media 11, in which digital signals according to the same specified digital audio format have been separately recorded are evaluated, the system may be so constructed as illustrated in FIG. 5, that a plurality of reproducing devices 10 and a signal change-over switch 15 are provided and a reproduced digital signal is directly inputted into the analyzer 30 through the signal change-over switch 15. According to such a digital audio tone evaluating system, the digital signal reproduced from the medium 11 can avoid being affected by the digital-analog converter and the analog-digital converter, so that the evaluation can be conducted with high precision.

All the above-described digital audio tone evaluating systems serve to evaluate the tone qualities of media. In the present invention, however, the tone qualities of reproducing devices can also be evaluated. In this case, it is only necessary to connect a reproducing device to be evaluated to, for example, the signal change-over switch and to use a standard medium, in which a digital signal related to voice and/or music has been recorded, to reproduce the digital signal in the standard medium by the reproducing device to be evaluated. According to such a digital audio tone evaluating system, differences in auditory tone quality among reproducing devices such as a compact disk player, a digital video disk player and a minidisk player, which are caused by constructional differences, for examples, differences in optical pickup, performance of servomotor circuit, error-correcting means and state of power source, can be grasped. Therefore, the evaluation system can be effectively utilized for research and development of reproducing devices.

Figure 6:
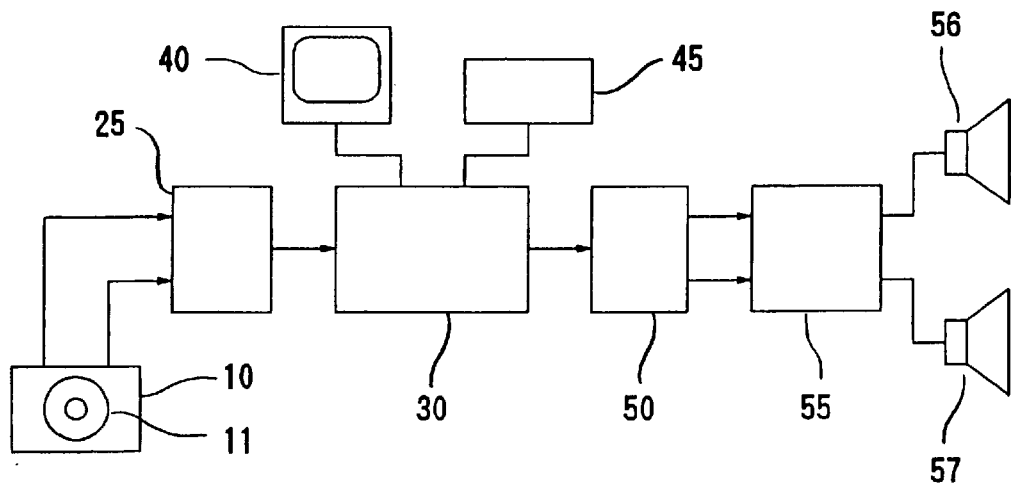
FIG. 6 schematically illustrates the construction of a digital audio tone evaluating system according to a still further embodiment of the present invention.

When a reproducing device is evaluated, the system may be so constructed as illustrated in FIG. 6, that an analog signal output terminal of a reproducing device 10 to be evaluated is connected to the analog-digital converter 25 to convert an analog signal outputted from the reproducing device 10 into a digital signal by the analog-digital converter 25, and the digital signal is inputted into the analyzer 30. According to such a digital audio tone evaluating system, the tone evaluation can be conducted as to the whole device including a digital-analog converter built in the reproducing device 10 to be evaluated.

The digital audio tone evaluating systems according to the present invention will hereinafter be described specifically by the following examples.

EXAMPLE 1

A digital music signal was recorded in a digital audio tape (hereinafter be abbreviated as "DAT"), and this DAT was used as a master tape to record a digital music signal in a compact disk (hereinafter be abbreviated as "CD").

The tone quality of the music by the digital music signals recorded in each of DAT and CD was evaluated by a digital audio tone evaluating system of the construction illustrated in FIG. 1. Incidentally, the time length of the digital music signal sampled by the analyzer was 750 msec.

Figure 7:
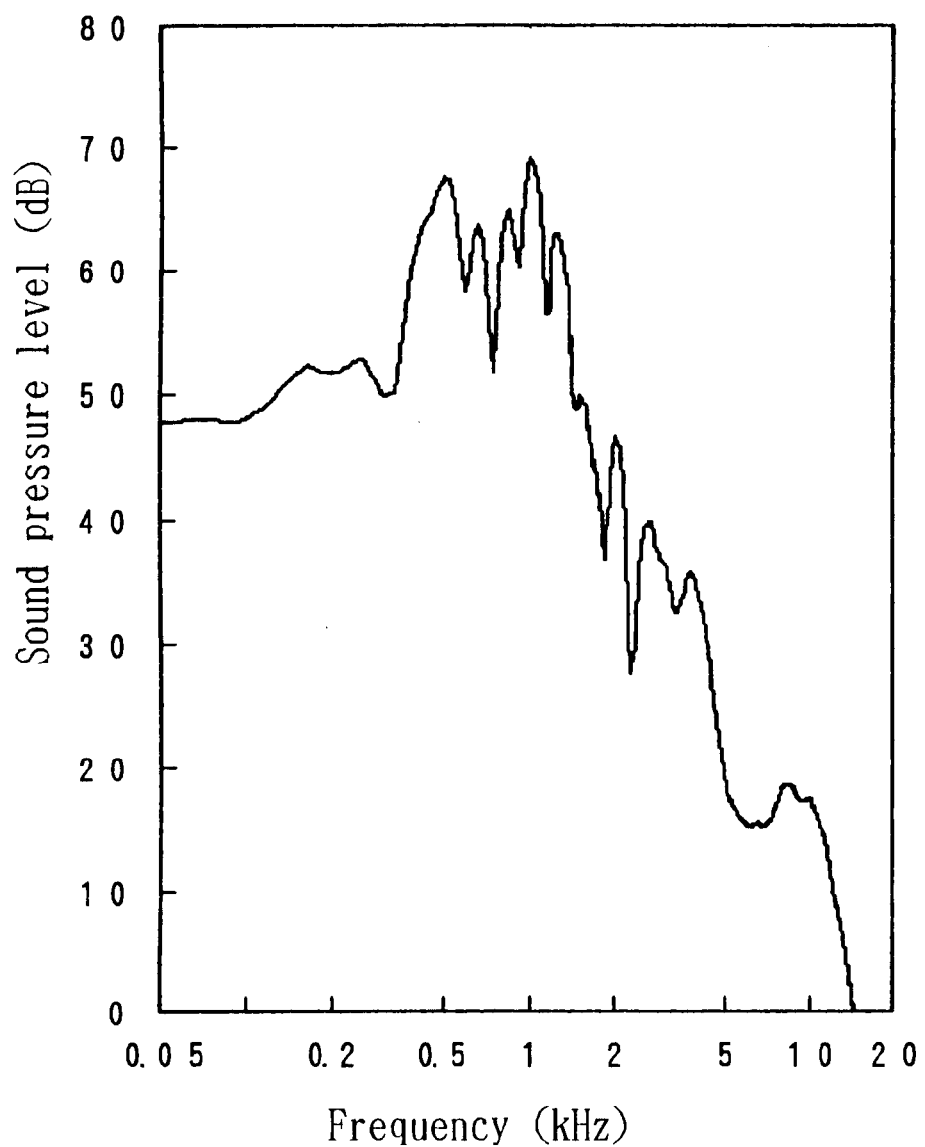
FIG. 7 diagrammatically illustrates frequency characteristics by fast Fourier transformation analysis in a digital music signal recorded in a compact disk in Example 1.
Figure 8:
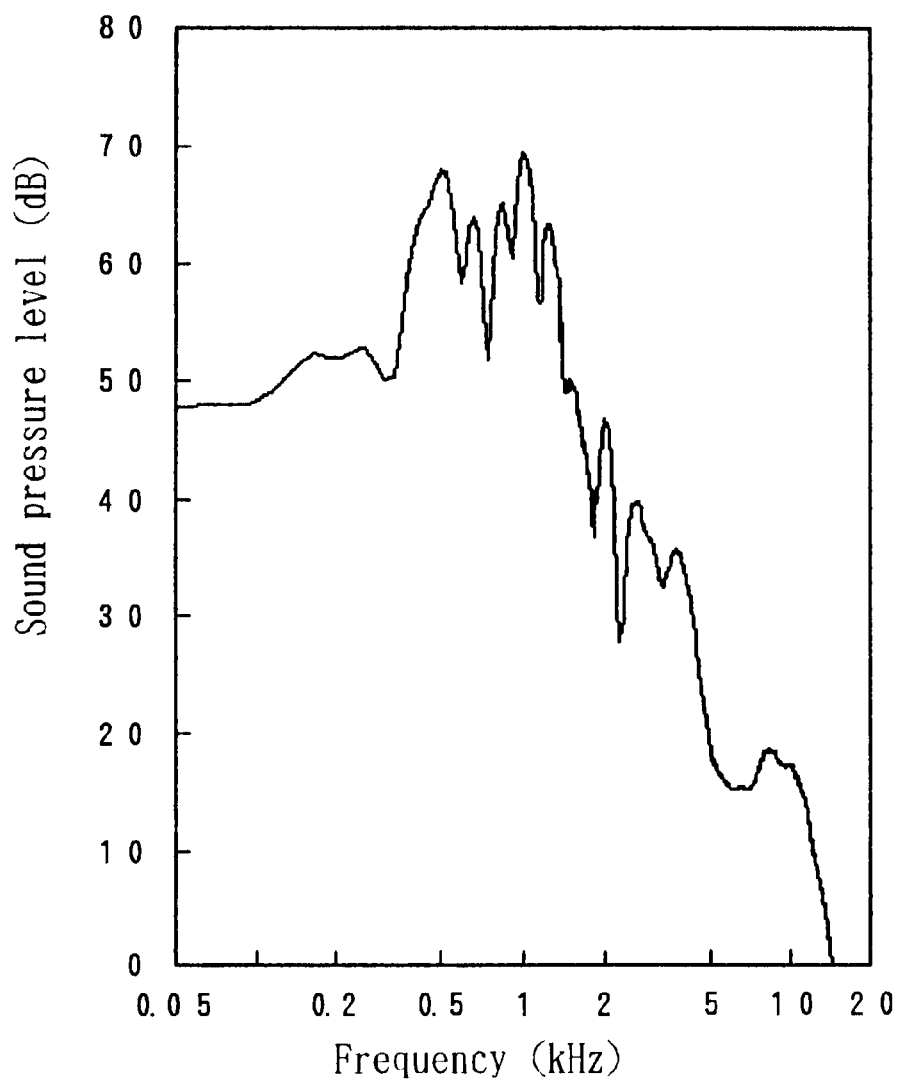
FIG. 8 diagrammatically illustrates frequency characteristics by fast Fourier transformation analysis in a digital music signal recorded in a digital audio tape in Example 1.

FIG. 7 diagrammatically illustrates frequency characteristics by fast Fourier transformation analysis as to the CD, and FIG. 8 diagrammatically illustrates frequency characteristics by fast Fourier transformation analysis as to the DAT. In FIGS. 7 and 8, an axis of abscissa and an axis of ordinate indicate frequency (kHz) and a sound pressure level (dB), respectively.

As apparent from these drawings, it is understood that little difference is observed between the CD and DAT in the frequency characteristics by the fast Fourier transformation analysis.

Figure 9:
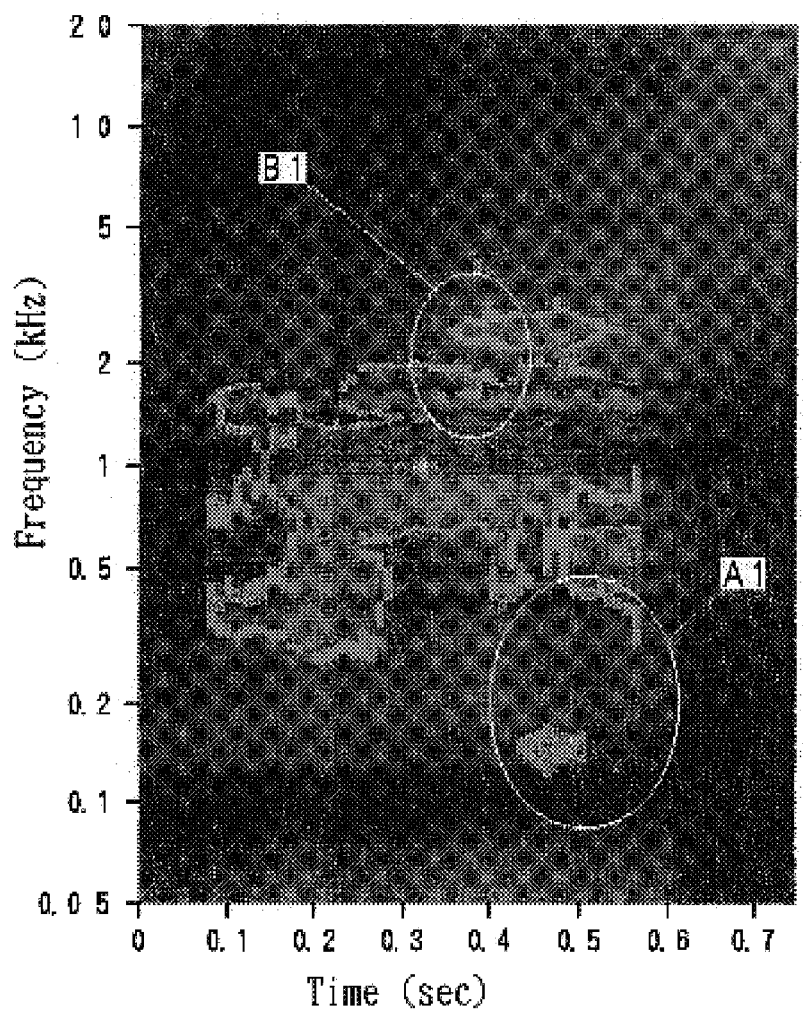
FIG. 9 illustrates the operation result of roughness in the digital music signal recorded in the compact disk in Example 1.
Figure 10:
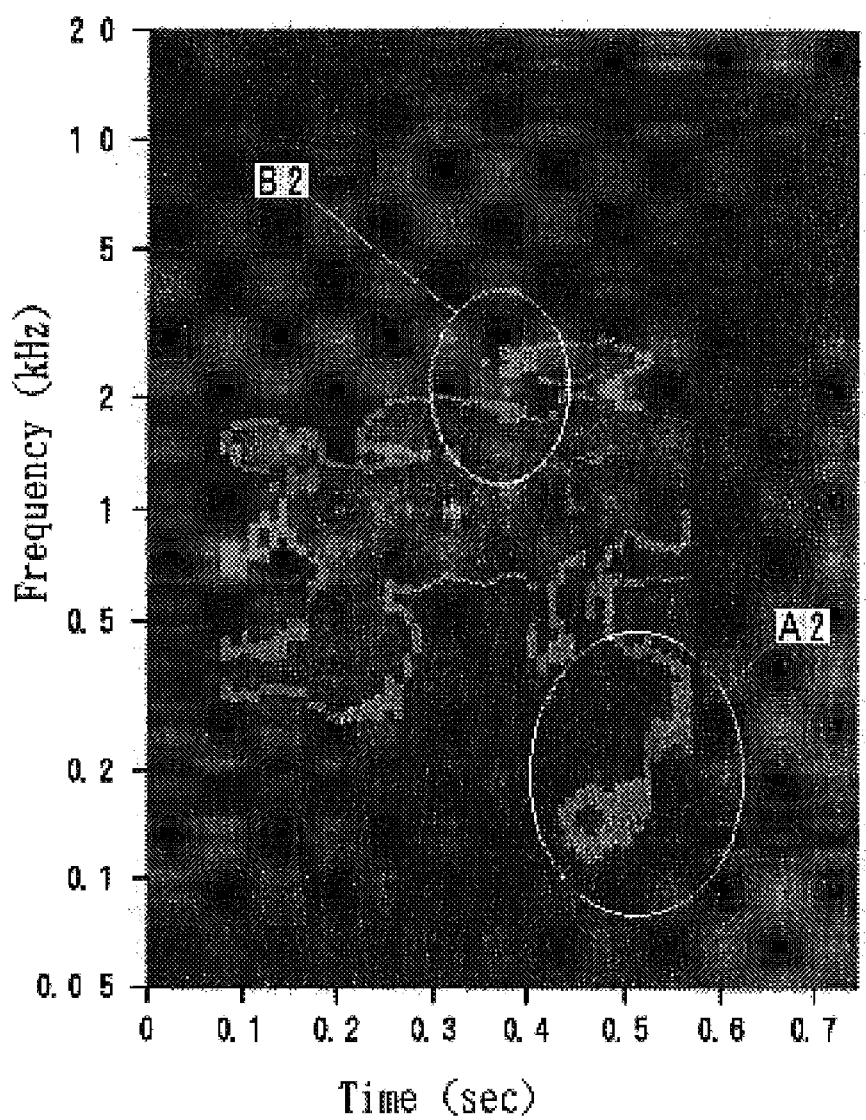
FIG. 10 illustrates the operation result of roughness in the digital music signal recorded in the digital audio tape in Example 1.

FIG. 9 illustrates the operation result of roughness as to the CD, and FIG. 10 illustrates the operation result of roughness as to the DAT. In FIGS. 9 and 10, an axis of abscissa indicates time (sec), an axis of ordinate indicates frequency (kHz), and light and shade indicate roughness (asper/Bark).

As apparent from these drawings, it is understood that differences are observed between the CD and DAT in roughness in low compass from 0.1 to 0.3 kHz in frequency (indicated by an area A1 in FIG. 9 and an area A2 in FIG. 10) and in high compass from 1.5 to 3 kHz in frequency (indicated by an area B1 in FIG. 9 and an area B2 in FIG. 10).

EXAMPLE 2

A digital music signal different from that of Example 1 was recorded in a DAT, and this DAT was used as a master tape to record a digital music signal in a CD.

The tone quality of the music by the digital music signals recorded in each of DAT and CD was evaluated by the digital audio tone evaluating system of the construction illustrated in FIG. 1. Incidentally, the time length of the digital music signal sampled by the analyzer was 250 msec.

Figure 11:
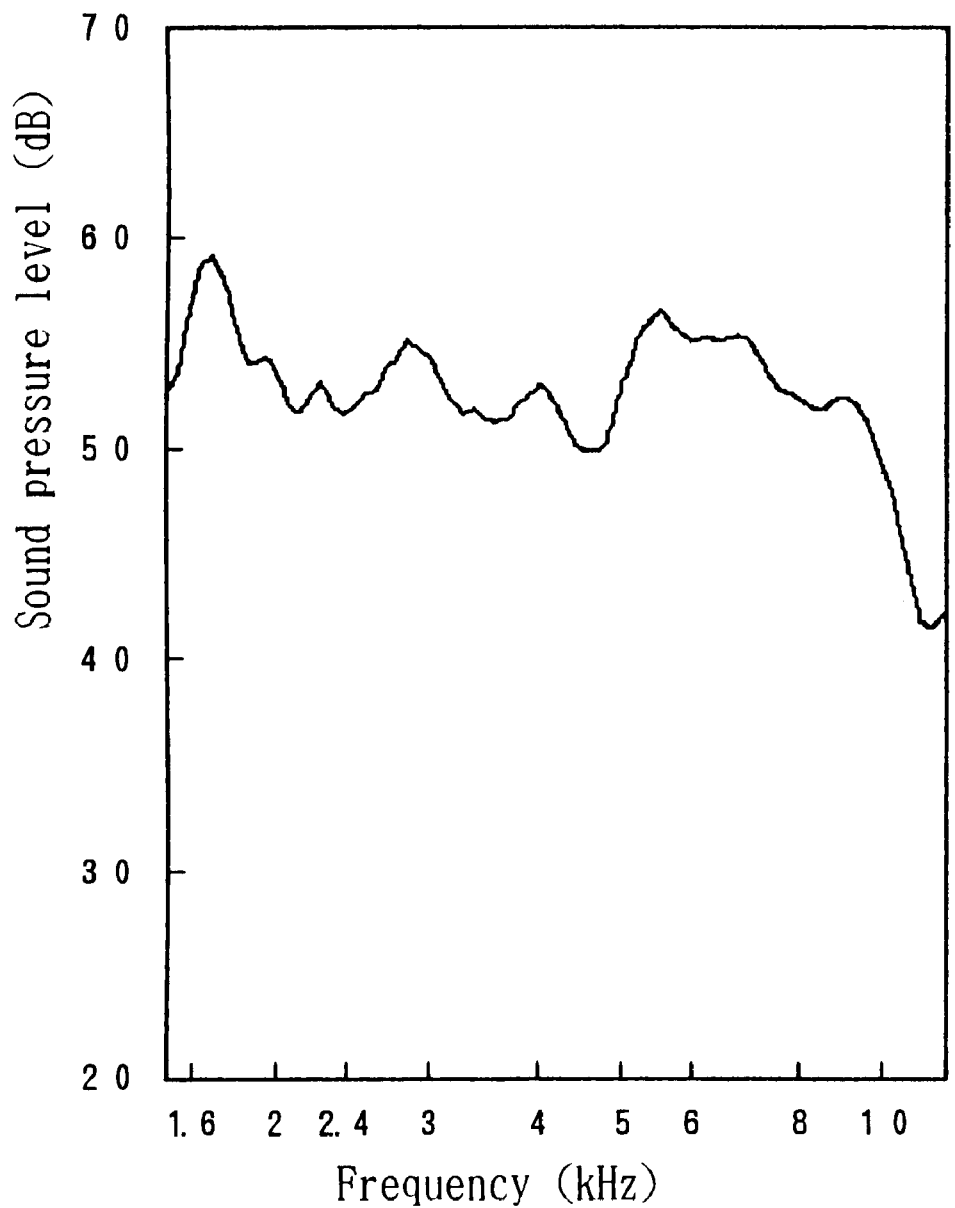
FIG. 11 diagrammatically illustrates frequency characteristics by fast Fourier transformation analysis in a digital music signal recorded in a compact disk in Example 2.
Figure 12:
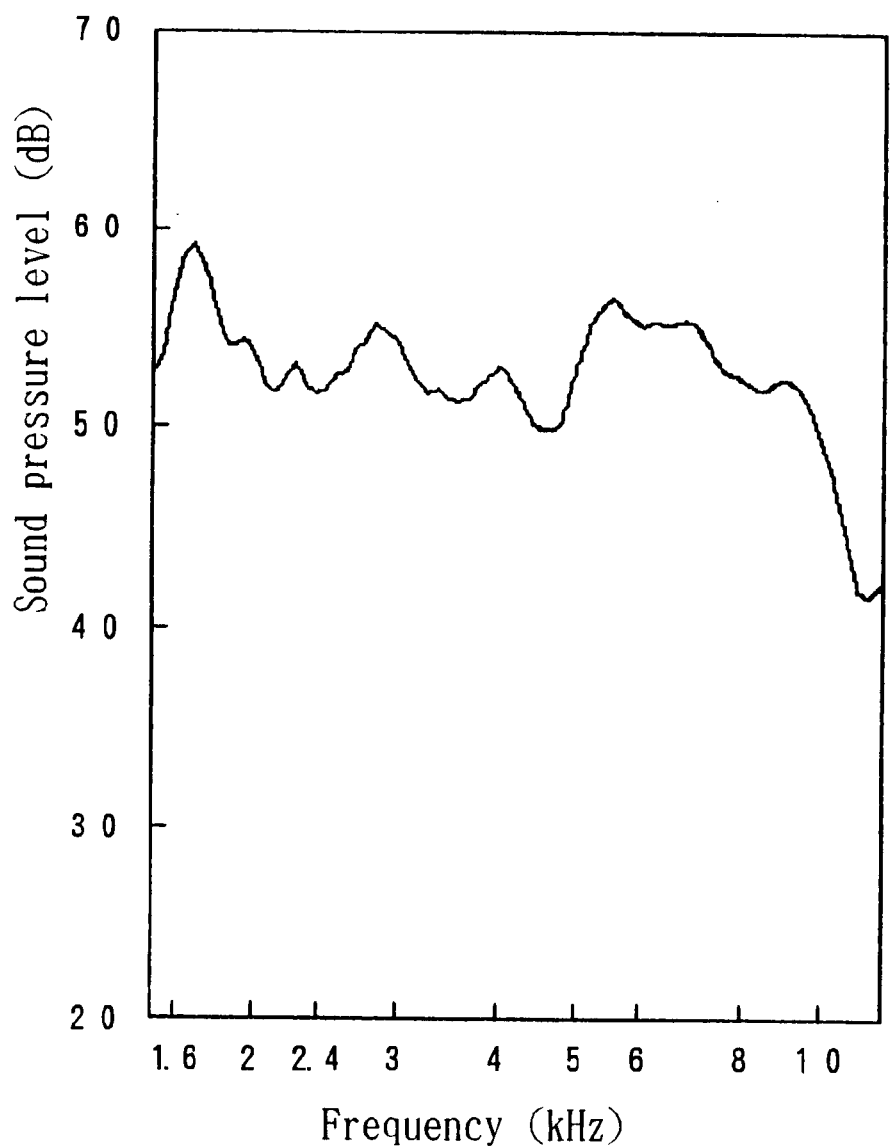
FIG. 12 diagrammatically illustrates frequency characteristics by fast Fourier transformation analysis in a digital music signal recorded in a digital audio tape in Example 2.

FIG. 11 diagrammatically illustrates frequency characteristics by fast Fourier transformation analysis as to the CD, and FIG. 12 diagrammatically illustrates frequency characteristics by fast Fourier transformation analysis as to the DAT. In FIGS. 11 and 12, an axis of abscissa and an axis of ordinate indicate frequency (kHz) and a sound pressure level (dB), respectively.

As apparent from these drawings, it is understood that little difference is observed between the CD and DAT in the frequency characteristics by the fast Fourier transformation analysis.

Figure 13:
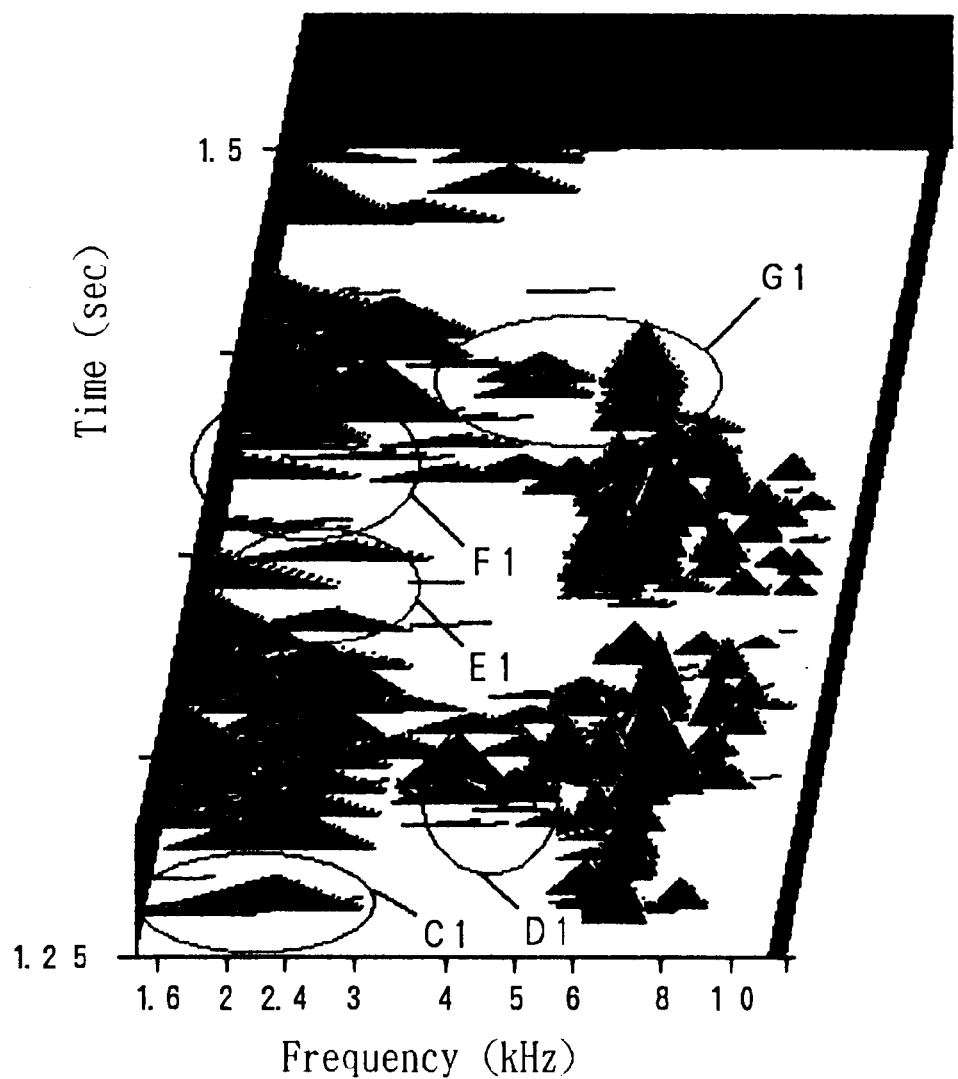
FIG. 13 illustrates the operation result of high-resolution spectral analysis in the digital music signal recorded in the compact disk in Example 2.

FIG. 13 illustrates the operation result of HAS as to the CD, and FIG. 14 illustrates the operation result of HAS as to DAT. In FIGS. 13 and 14, an axis of abscissa indicates frequency (kHz), an axis of ordinate indicates time (sec), and the height of a crest indicates a value (dB) by HAS.

As apparent from these drawings, it is understood that differences are observed between the CD and DAT in HAS value in high compass widely ranging from 1.5 to 5 kHz in frequency (indicated by areas C1, D1, E1, F1 and G1 in FIG. 13 and areas C2, D2, E2, F2 and G2 in FIG. 14).

What is claimed is:

1. A digital audio tone evaluating system comprising:
an analyzer configured to perform signal processing on a digital signal related to voice and/or music to generate a factor which expresses the auditory tone quality of the voice and/or the music by the digital signal in a digitized form,
wherein the analyzer generates the factor which expresses the auditory tone quality using at least one acoustic psychological parameter derived from at least one non-linear frequency resolving characteristic of human hearing
wherein the factor generated by the analyzer is derived by dividing the digital signal into a plurality of critical bands, and by applying a formula $$N = \int_{z=0}^{24\ Bark} N'(z)dz$$

(sone), wherein $$N'(z) = N'_0 \cdot \left(\frac{1}{s} \cdot \frac{E_{HS}(z)}{E_0}\right)^k \cdot \left[\left(1 - s + s\frac{E(z)}{E_{HS}(z)}\right)^k - 1\right]$$

(sone/Bark), and
wherein N represents the factor generated by the analyzer, (N'(z) represents a partial loudness value every critical band, $E_o$ represents a reference value of sound intensity, E(z) represents an excitatory factor as to z, $E_{HS}(z)$ represents an excitatory factor of noise that the human sense of hearing has, $N'_o$ represents a reference loudness value, s represents a boundary factor, k represents 0.23, Bark represents a unit of a divided one of the plurality of critical bands and z denotes a number of the divided one of the plurality of critical bands.

2. A digital audio tone evaluating system comprising:

a reproducing device configured to reproduce a digital signal according to a specified digital audio format, related to voice and/or music recorded in a medium to be evaluated; and an analyzer configured to perform signal processing on the digital signal from the reproducing device to generate a factor which expresses the auditory tone quality of the voice and/or the music by the digital signal in a digitized form, wherein the analyzer generates the factor which expresses the auditory tone quality using at least one acoustic psychological parameter derived from at least one non-linear frequency resolving characteristic of human hearing wherein the factor generated by the analyzer is derived by dividing the digital signal into a plurality of critical bands, and by applying a formula $$N = \int_{z=0}^{24\,Bark} N'(z)dz$$

(sone), wherein $$N'(z) = N'_0 \cdot \left(\frac{1}{s} \cdot \frac{E_{HS}(z)}{E_0}\right)^k \cdot \left[\left(1 - s + s\frac{E(z)}{E_{HS}(z)}\right)^k - 1\right]$$

(sone/Bark), and wherein N represents the factor generated by the analyzer, N'(z) represents a partial loudness value every critical band, $E_o$ represents a reference value of sound intensity, E(z) represents an excitatory factor as to z, $E_{HS}(z)$ represents an excitatory factor of noise that the human sense of hearing has, $N'_o$ represents a reference loudness value, s represents a boundary factor, k represents 0.23, Bark represents a unit of a divided one of the plurality of critical bands and z denotes a number of the divided one of the plurality of critical bands.

3. A digital audio tone evaluating system comprising:

an analyzer configured to perform signal processing on a digital signal, which is inputted from a reproducing device to be evaluated for producing a digital signal according to a specified digital audio format, related to voice and/or music recorded in a standard medium, to generate a factor which expresses the auditory tone quality of the voice and/or the music by the digital signal in a digitized form, wherein the analyzer generates the factor which expresses the auditory tone quality using at least one acoustic psychological parameter derived from at least one non-linear frequency resolving characteristic of human hearing wherein the factor generated by the analyzer is derived by dividing the digital signal into a plurality of critical bands, and by applying a formula $$N = \int_{z=0}^{24\,Bark} N'(z)dz$$

(sone), wherein $$N'(z) = N'_0 \cdot \left(\frac{1}{s} \cdot \frac{E_{HS}(z)}{E_0}\right)^k \cdot \left[\left(1 - s + s\frac{E(z)}{E_{HS}(z)}\right)^k - 1\right]$$

(sone/Bark), and wherein N represents the factor generated by the analyzer, N'(z) represents a partial loudness value every critical band, $E_o$ represents a reference value of sound intensity, E(z) represents an excitatory factor as to z, $E_{HS}(z)$ represents an excitatory factor of noise that the human sense of hearing has, $N'_o$ represents a reference loudness value, s represents a boundary factor, k represents 0.23, Bark represents a unit of a divided one of the plurality of critical bands and z denotes a number of the divided one of the plurality of critical bands.

4. A digital audio tone evaluating system comprising:

a reproducing device for reproducing a digital signal related to voice and/or music recorded in a medium to be evaluated;

a digital-analog converter configured to convert the digital signal from the reproducing device into an analog signal;

an analog-digital converter configured to convert the analog signal from the digital-analog converter into a digital signal according to a specified digital audio format; and an analyzer configured to perform signal processing on the digital signal from the analog-digital converter to generate a factor which expresses the auditory tone quality of the voice and/or the music by the digital signal in a digitized form, wherein the analyzer generates the factor which expresses the auditory tone quality using at least one acoustic psychological parameter derived from at least one non-linear frequency resolving characteristic of human hearing wherein the factor generated by the analyzer is derived by dividing the digital signal into a plurality of critical bands, and by applying a formula $$N = \int_{z=0}^{24\,Bark} N'(z)dz$$

(sone), wherein $$N'(z) = N'_0 \cdot \left(\frac{1}{s} \cdot \frac{E_{HS}(z)}{E_0}\right)^k \cdot \left[\left(1 - s + s\frac{E(z)}{E_{HS}(z)}\right)^k - 1\right]$$

(sone/Bark), and wherein N represents the factor generated by the analyzer, N'(z) represents a partial loudness value every critical band, $E_o$ represents a reference value of sound intensity, E(z) represents an excitatory factor as to z, $E_{HS}(z)$ represents an excitatory factor of noise that the human sense of hearing has, $N'_o$ represents a reference loudness value, s represents a boundary factor, k represents 0.23, Bark represents a unit of a divided one of the plurality of critical bands and z denotes a number of the divided one of the plurality of critical bands.

5. A digital audio tone evaluating system comprising:

a digital-analog converter configured to convert a digital signal, which has been outputted from a reproducing device to be evaluated by which a digital signal related to voice and/or music recorded in a standard medium is reproduced, into an analog signal;

an analog-digital converter configured to convert the analog signal from the digital-analog converter into a digital signal according to a specified digital audio format; and an analyzer configured to perform signal processing on the digital signal from the analog-digital converter to generate a factor which expresses the auditory tone quality of the voice and/or the music by the digital signal in a digitized form, wherein the analyzer generates the factor which expresses the auditory tone quality using at least one acoustic psychological parameter derived from at least one non-linear frequency resolving characteristic of human hearing wherein the factor generated by the analyzer is derived by dividing the digital signal into a plurality of critical bands, and by applying a formula $$N = \int_{z=0}^{24\ Bark} N'(z)\,dz$$

(sone), wherein $$N'(z) = N'_0 \cdot \left(\frac{1}{s} \cdot \frac{E_{HS}(z)}{E_0}\right)^k \cdot \left[\left(1 - s + s\frac{E(z)}{E_{HS}(z)}\right)^k - 1\right]$$

(sone/Bark), and wherein N represents the factor generated by the analyzer, N'(z) represents a partial loudness value every critical band, $E_o$ represents a reference value of sound intensity, E(z) represents an excitatory factor as to z, $E_{HS}(z)$ represents an excitatory factor of noise that the human sense of hearing has, N'$_o$ represents a reference loudness value, s represents a boundary factor, k represents 0.23, Bark represents a unit of a divided one of the plurality of critical bands and z denotes a number of the divided one of the plurality of critical bands.

6. A digital audio tone evaluating system for evaluating a digital-analog converter built-in reproducing device, comprising:

an analog-digital converter configured to convert an analog signal, which has been outputted from a reproducing device to be evaluated by which a digital signal related to voice and/or music recorded in a standard medium is reproduced and converted into the analog signal, into a digital signal according to a specified digital audio format; and an analyzer configured to perform signal processing on the digital signal from the analog-digital converter to generate a factor which expresses the auditory tone quality of the voice and/or the music by the digital signal in a digitized form, wherein the analyzer generates the factor which expresses the auditory tone quality using at least one acoustic psychological parameter derived from at least one non-linear frequency resolving characteristic of human hearing wherein the factor generated by the analyzer is derived by dividing the digital signal into a plurality of critical bands, and by applying a formula $$N = \int_{z=0}^{24\ Bark} N'(z)\,dz$$

(sone), wherein $$N'(z) = N'_0 \cdot \left(\frac{1}{s} \cdot \frac{E_{HS}(z)}{E_0}\right)^k \cdot \left[\left(1 - s + s\frac{E(z)}{E_{HS}(z)}\right)^k - 1\right]$$

(sone/Bark), and wherein N represents the factor generated by the analyer, N'(z) represents a partial loudness value every critical band, $E_o$ represents a reference value of sound intensity, E(z) represents an excitatory factor as to z, $E_{HS}$ (z) represents an excitatory factor of noise that the human sense of hearing has, N'$_o$ represents a reference loudness value, s represents a boundary factory, k represents 0.23, Bark represents a unit of a divided one of the plurality of critical bands and z denotes a number of the divided one of the plurality of critical bands.

7. The digital audio tone evaluating system according to claim 2, 3, 4 or 5, which comprises a signal change-over switch for selecting and outputting one of digital signals from a plurality of reproducing devices.

8. The digital audio tone evaluating system according to claim 7, which comprises an automatic controller for automatically controlling the reproducing device, the signal change-over switch and the analyzer.

9. The digital audio tone evaluating system according to claim 1, 2, 3, 4, 5 or 6, which comprises a digital-analog converter for converting the digital signal from the analyzer into an analog signal, an amplifier, and a speaker.

10. The digital audio tone evaluating system according to claim 1, 2, 3, 4, 5 or 6, which comprises a storing means for storing the digital signal inputted into the analyzer and/or the analyzed result of the digital signal.

11. The digital audio tone evaluating system according to claim 1, 2, 3, 4, 5 or 6, wherein the factor generated by the analyzer is loudness.

12. The digital audio tone evaluating system according to claim 1, 2, 3, 4, 5 or 6, wherein the factor generated by the analyzer is roughness.

13. The digital audio tone evaluating system according to claim 1, 2, 3, 4, 5 or 6, wherein the factor generated by the analyzer is high-resolution spectral analysis.

* * * * *